United States Patent
Wei et al.

(10) Patent No.: US 12,170,630 B2
(45) Date of Patent: Dec. 17, 2024

(54) METHOD, DEVICE AND SYSTEM FOR CONFIGURING RADIO TRANSMISSION AND RECEPTION PARAMETERS

(71) Applicant: ZTE CORPORATION, Guangdong (CN)

(72) Inventors: Ning Wei, Shenzhen (CN); Kaiying Lv, Shenzhen (CN); Bo Sun, Shenzhen (CN); Xuelin Zhang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 8 days.

(21) Appl. No.: 17/581,050

(22) Filed: Jan. 21, 2022

(65) Prior Publication Data

US 2022/0224485 A1     Jul. 14, 2022

Related U.S. Application Data

(63) Continuation of application No. 16/522,322, filed on Jul. 25, 2019, now Pat. No. 11,233,618, which is a (Continued)

(30) Foreign Application Priority Data

Jan. 26, 2017  (CN) .......................... 201710061675.0

(51) Int. Cl.
*H04L 5/00* (2006.01)
*H04B 7/0452* (2017.01)
(Continued)

(52) U.S. Cl.
CPC ......... *H04L 5/0053* (2013.01); *H04B 7/0452* (2013.01); *H04W 28/18* (2013.01); *H04W 72/0446* (2013.01); *H04L 2101/622* (2022.05)

(58) Field of Classification Search
CPC ............ H04L 5/0053; H04L 2101/622; H04L 5/0023; H04B 7/0452; H04W 28/18; H04W 72/0446; H04W 28/0205
See application file for complete search history.

(56) References Cited

U.S. PATENT DOCUMENTS 10,531,407 B1 * 1/2020 Lee .................. H04W 72/0453
2011/0096796 A1    4/2011 Zhang et al.
(Continued)

FOREIGN PATENT DOCUMENTS

CN    104126321 A    10/2014
CN    105873147 A     8/2016
(Continued)

OTHER PUBLICATIONS

Extended European Search Report for EP Appl. No. 17894454.2, dated Oct. 26, 2020. (10 pages).
(Continued)

*Primary Examiner* — Ajit Patel
*Assistant Examiner* — Wilfred Thomas
(74) *Attorney, Agent, or Firm* — Foley & Lardner LLP (57) ABSTRACT

Disclosed is a method for configuring radio transmission and reception parameters. The method includes: configuring, by a station, a transmission module by using a first parameter set and transmitting a first radio frame, where the first radio frame has a second parameter set; and configuring, by the station, a reception module by using the second parameter set and receiving a second radio frame triggered by the first radio frame. Also disclosed are an apparatus and system for configuring radio transmission and reception parameters.

8 Claims, 2 Drawing Sheets

Related U.S. Application Data continuation of application No. PCT/CN2017/113493, filed on Nov. 29, 2017.

(51) Int. Cl.
*H04L 101/622* (2022.01)
*H04W 28/18* (2009.01)
*H04W 72/0446* (2023.01)

(56) References Cited

U.S. PATENT DOCUMENTS

| | | | |
|---|---|---|---|
| 2011/0182241 A1* | 7/2011 | Hansen | H04L 5/0048 370/328 |
| 2012/0164950 A1* | 6/2012 | Nentwig | H04B 17/24 455/114.2 |
| 2012/0287822 A1* | 11/2012 | Jeon | H04W 8/005 370/255 |
| 2013/0208715 A1 | 8/2013 | Roh et al. | |
| 2015/0124746 A1* | 5/2015 | Wu | H04W 74/008 370/329 |
| 2015/0208444 A1 | 7/2015 | Park et al. | |
| 2015/0382333 A1 | 12/2015 | Seok | |
| 2016/0135147 A1* | 5/2016 | Ouchi | H04W 52/32 370/329 |
| 2016/0330714 A1* | 11/2016 | Hedayat | H04L 5/0023 |
| 2017/0012756 A1 | 1/2017 | Li et al. | |
| 2017/0149523 A1 | 5/2017 | Li et al. | |
| 2017/0150493 A1* | 5/2017 | Seok | H04B 7/0452 |
| 2018/0014329 A1* | 1/2018 | Lee | H04L 5/0092 |
| 2018/0191453 A1* | 7/2018 | Zhao | H04L 5/0053 |
| 2018/0359761 A1* | 12/2018 | Chun | H04W 72/21 |
| 2019/0052353 A1 | 2/2019 | Kim et al. | |
| 2019/0306920 A1 | 10/2019 | Son et al. | |
| 2021/0185729 A1* | 6/2021 | Trainin | H04W 74/0816 |

FOREIGN PATENT DOCUMENTS

| | | |
|---|---|---|
| CN | 106304357 A | 1/2017 |
| CN | 106487490 A | 3/2017 |
| EP | 3 379 873 A1 | 9/2018 |
| WO | WO-2016/167608 A1 | 10/2016 |
| WO | WO-2016/167609 A1 | 10/2016 |
| WO | WO-2016/176680 A1 | 11/2016 |

OTHER PUBLICATIONS

Final Office Action on U.S. Appl. No. 16/522,322 DTD Jan. 22, 2021.
IEEE: "High Efficiency (HE) PHY specification" TGAX CL 26, IEEE-SA, Piscataway, NJ USA—' vol. 802.llax drafts, No. D0.5 Oct. 1, 2016 (Oct. 1, 2016), pp. 1-207, XP068137445, Retrieved from the Internet: URL:www.ieee802.org/11/private/Draft-Stand ards/llax/TGax CI 26.rtf.
International Search Report and Written Opinion for International Appl. No. PCT/CN2017/113493, mailed on Feb. 11, 2018.
Non-Final Office Action on U.S. Appl. No. 16/522,322 DTD Aug. 18, 2020.
US Notice of Allowance on U.S. Appl. No. 16/522,322 dated Sep. 15, 2021 (9 pages).
First Office Action for CN Appl. No. 2017100616750, dated Sep. 28, 2022 (with English translation, 17 pages).
Interdigital Communications, "MAC Layer Impact of Supporting Different Services" 3GPP TSG-RAN WG2 #96, R2-168468, Nov. 18, 2016, Reno, Nevada (4 pages).

* cited by examiner

METHOD, DEVICE AND SYSTEM FOR CONFIGURING RADIO TRANSMISSION AND RECEPTION PARAMETERS

CROSS-REFERENCE TO RELATED APPLICATIONS

This application claims the benefit of priority under 35 U.S.C. § 120 as a continuation of U.S. Non-Provisional patent application Ser. No. 16/522,322, filed on Jul. 25, 2019, which is a continuation of PCT Patent Application No. PCT/CN2017/113493, filed on Nov. 29, 2017, which claims priority to Chinese patent application No. 201710061675.0, filed on Jan. 26, 2017, the disclosure each of which is incorporated herein by reference in its entirety

TECHNICAL FIELD

The present disclosure relates to the field of communication technology and, in particular, to a method, apparatus and system for configuring radio transmission and reception parameters.

BACKGROUND

In a dense scenario, an uplink single-user transmission mechanism in the conventional wireless local area network (WLAN) protocol greatly limits the overall transmission efficiency of the network. In order to solve the problem of low overall transmission efficiency of the network caused by the uplink single-user transmission, 802.11ax introduces scheduling-based uplink multi-user transmission. The basic process of the introduced transmission may be summarized as follows: after completing operations such as channel access, an access point (AP) station transmits a trigger radio frame to a scheduled station to complete distribution of scheduling information such as resource allocation. Each scheduled station transmits a trigger-based physical protocol data unit (PPDU) according to scheduling information in the trigger radio frame to complete the uplink multi-user transmission. When the conventional uplink single-user transmission is performed, the AP station may acquire signaling information, which is required for parsing data analysis, from a preamble of a radio frame transmitted by the scheduled station. The signaling information is for example a used coding type such as binary convolutional code (BCC) or low-density parity-check code (LDPC), a modulation and coding scheme (MCS), the number of spatial streams, whether to perform beamforming. The AP station further parses load information of the radio frame according to the acquired information and a corresponding algorithm.

SUMMARY

In a scheduling-based uplink multi-user transmission process in 802.11ax, a preamble of a Trigger-based PPDU transmitted by a scheduled station does not carry signaling information required for AP station to parse data. This therefore prevents the AP station from receiving the Trigger-based PPDU normally.

In order to solve the above technical problems, embodiments of the present disclosure expect to provide a method, an apparatus, and a system for configuring radio transmission and reception parameters, which solves a problem in the existing reception process that a physical layer cannot normally receive a trigger-based radio frame of a scheduled station.

The technical solutions of the present disclosure are implemented as follows.

An embodiment of the present disclosure provides a method for configuring radio transmission and reception parameters. The method includes steps described below.

Before a trigger radio frame is transmitted, a station configures a transmission module by using a first parameter set. The transmission module transmits a first radio frame having a second parameter set. The station configures a reception module by using the second parameter set and receives a second radio frame transmitted by using all or a part of parameters of the second parameter set.

According to this embodiment, the reception parameter information or the reception signaling information includes a common parameter/signaling part and a user parameter/signaling part.

According to this embodiment, the common parameter/signaling part includes at least one of: a bandwidth, a guard interval and a long training sequence type, a long training sequence type of multi-user multiple-input and multiple-output (MU-MIMO), the number of efficient long training sequences, whether to use space-time coding, whether to have an additional symbol part of a low density check code, a packet extension type, and whether to use a fixed pilot.

According to this embodiment, the user parameter/signaling part includes at least one of: an identifier number of an associated user, resource unit allocation, a coding type, a modulation and coding scheme, whether to use dual-carrier modulation, spatial stream allocation, and a received signal strength of the user on a scheduling device side.

According to this embodiment, if a trigger radio frame transmission indication is in a first state, the scheduling device configures a second parameter module by using the second parameter set, or a third parameter module configures the second parameter module by using a third parameter set. If the trigger radio frame transmission indication fails to be received or the trigger radio frame transmission indication is in a second state, the scheduling device does not configure the second parameter module by using the second parameter set, and the third parameter module does not configure the second parameter module by using the third parameter set.

According to this embodiment, the first state and the second state for transmitting a scheduling radio frame are respectively used for identifying whether to transmit the trigger radio frame, and are represented by one or more variables of the same type and/or different types, where the one or more variables have different values.

The variables of different types include: integer variables, floating-point variables, character variables, logical variables, byte variables, text variables, and object variables.

According to this embodiment, the first parameter set and/or the second parameter set and/or the third parameter set and/or the trigger radio frame transmission indication are carried by a parameter variable in an interactive instruction or an interactive primitive of the scheduling device; or the first parameter set and/or the second parameter set and/or the third parameter set and/or the trigger radio frame transmission indication are carried by a parameter variable of the scheduling device other than the parameter variable in the interactive instruction or the interactive primitive.

According to this embodiment, the interactive instruction or the interactive primitive includes: a transmission start request primitive, a data request primitive, and a transmission end request primitive.

According to this embodiment, the second parameter set becomes valid after being configured to the reception module.

According to this embodiment, the validity of the second parameter set continues until the station successfully receives the second radio frame or the station fails to receive the second radio frame.

Optionally, the validity of the second parameter set does not exceed a predefined time length, or a predefined number of received frames, or a predefined number of received bytes.

Optionally, the validity of the second parameter set or the third parameter set in the second parameter module of the scheduling device and the validity of a third parameter set in a third parameter module of the scheduling device do not exceed a time interval; and after waiting time exceeds the time interval, the scheduling device invalidates the second parameter set or the third parameter set in the second parameter module of the scheduling device by zeroing or clearing or other manners.

A length of the time interval is greater than or equal to a time length from the time when the scheduling device completes the transmission of the trigger radio frame to the time when a scheduling-based radio frame of the scheduled device is received.

According to this embodiment, the existence form of the first parameter module, the second parameter module and the third parameter module of the scheduling device includes the physical entity and the logical entity.

An embodiment of the present disclosure further provides an apparatus for configuring radio transmission and reception parameters. The apparatus includes a configuration unit.

The configuration unit is configured to directly or indirectly configure a transmission module of a device by using a first parameter set, and directly or indirectly configure a reception module of the device by using a second parameter set. The transmission module transmits a first radio frame by using the first parameter set, where the first radio frame has the second parameter set. The reception module, by using the second parameter set, receives a second radio frame transmitted by using the second parameter set.

According to this embodiment, the apparatus further includes an agent module. The agent module receives the first parameter set from the configuration module and configures the transmission module by using the second parameter set; and receives the first parameter set from the configuration module and configures the reception module by using the second parameter set.

An embodiment of the present disclosure further provides a system for configuring radio transmission and reception parameters. The system includes a scheduling device and a scheduled device. The scheduling device includes the above apparatus for configuring radio transmission and reception parameters.

In the method, apparatus and system for configuring radio transmission and reception parameters provided by the embodiments of the present disclosure, before a trigger radio frame is transmitted, the scheduling device configures the first transmission module of the scheduling device by using the first parameter set; before the trigger-based radio frame of the scheduled device is received, the scheduling device configures the second transmission module of the scheduling device by using the second parameter set, or before the trigger-based radio frame of the scheduled device is received, the scheduling device configures the third parameter module different from the first parameter module and the second parameter set; and the third parameter module configures the second parameter module by using the third parameter set. Therefore, the problem in the existing reception process that a physical layer cannot normally receive the trigger-based radio frame of the scheduled station is solved.

BRIEF DESCRIPTION OF DRAWINGS

The above and other features and advantages of the present disclosure will become more apparent in detailed description of embodiments with reference to the drawings.

DETAILED DESCRIPTION

Technical solutions in embodiments of the present disclosure will be described clearly and completely in conjunction with drawings in the embodiments of the present disclosure.

Embodiments of the present disclosure provide a method for configuring radio transmission and reception parameters.

In an embodiment of the present disclosure, before a first radio frame is transmitted, a station directly or indirectly configures a transmission module by using a first parameter set; the transmission module transmits the first radio frame, where the first radio frame having a second parameter set; the station directly or indirectly configures a reception module by using the second parameter set; and the reception module, by using the second parameter set, receives a second radio frame transmitted by using all or a part of parameters of the second parameter set.

In this embodiment, the trigger radio frame includes scheduling information of a scheduling device to a scheduled device. After receiving the trigger radio frame, the scheduled device transmits a trigger-based radio frame to the scheduling device according to the scheduling information carried by the trigger radio frame. A first parameter module provides transmission parameter information for the scheduling device to transmit the radio frame. A second parameter module provides reception parameter information for the scheduling device to receive the radio frame. A third parameter module stores the second parameter set and forwards the stored second parameter set to the second parameter module. The first parameter set includes transmission parameter information or transmission signaling information required for the scheduling device to transmit the radio frame. The second parameter set includes reception parameter information or reception signaling information required for the scheduling device to receive the radio frame. The third parameter set includes the reception parameter information or the reception signaling information which is included in the second parameter set and is required for the scheduling device to receive the radio frame.

In this embodiment, the reception parameter information or the reception signaling information includes a common parameter (signaling) part and a user parameter (signaling) part.

The common parameter (signaling) part includes at least one of: a bandwidth, a guard interval and a long training sequence type, a long training sequence type of MU-MIMO, the number of efficient long training sequences, whether to use space-time coding, whether to have an additional symbol part of a low density check code, a packet extension type, and whether to use a fixed pilot. The user parameter (signaling) part includes at least one of: an identifier number of an associated user, resource unit allocation, a coding type, a modulation and coding scheme, whether to use dual-carrier modulation, spatial stream allocation, and a received signal strength of the user on a scheduling device side.

In this embodiment, if a trigger radio frame transmission indication is in a first state, the scheduling device configures a second parameter module by using the second parameter set, or a third parameter module configures the second parameter module by using a third parameter set. If the trigger radio frame transmission indication fails to be received or the trigger radio frame transmission indication is in a second state, the scheduling device does not configure the second parameter module by using the second parameter set, and the third parameter module does not configure the second parameter module by using the third parameter set.

The first state and the second state for transmitting a scheduling radio frame are respectively used for identifying whether to transmit the trigger radio frame, and are represented by one or more variables of the same type and/or of different types, where the one or more variables have different values. The variables of different types include: integer variables, floating-point variables, character variables, logical variables, byte variables, text variables, and object variables.

In this embodiment, the first parameter set and/or the second parameter set and/or the third parameter set and/or the trigger radio frame transmission indication are carried by a parameter variable in an interactive instruction (or an interactive primitive) of the scheduling device; or the first parameter set and/or the second parameter set and/or the third parameter set and/or the trigger radio frame transmission indication are carried by a parameter variable of the scheduling device other than the parameter variable in the interactive instruction (or the interactive primitive).

The interactive instruction or the interactive primitive includes: a transmission start request primitive, a data request primitive, and a transmission end request primitive.

In this embodiment, the validity of the second parameter set or the third parameter set in the second parameter module of the scheduling device and the validity of the third parameter set in the third parameter module of the scheduling device continue until the scheduling device performs a reconfiguration operation.

Optionally, the validity of the second parameter set or the third parameter set in the second parameter module of the scheduling device and the validity of the third parameter set in the third parameter module of the scheduling device do not exceed a time interval; and after waiting time exceeds the time interval, the scheduling device invalidates the second parameter set or the third parameter set in the second parameter module of the scheduling device by zeroing or clearing or other manners.

A length of the time interval is greater than or equal to a time length from the time when the scheduling device completes the transmission of the trigger radio frame to the time when a scheduling-based radio frame of the scheduled device is received.

In this embodiment, the existence form of the first parameter module, the second parameter module and the third parameter module of the scheduling device includes the physical entity and the logical entity.

An embodiment of the present disclosure further provides an apparatus for configuring radio transmission and reception parameters. The apparatus includes a first configuration unit and a second configuration unit.

The first configuration unit is configured to, before a trigger radio frame is transmitted, configure a first parameter module of a scheduling device by using a first parameter set.

The second configuration unit is configured to, before a trigger-based radio frame of the scheduled device is received, configure a second parameter module of the scheduling device by using a second parameter set, or is configured to before the trigger-based radio frame of the scheduled device is received, configure a third parameter module different from the first parameter module and the second parameter module by using the second parameter set, where the third parameter module configures the second parameter module by using a third parameter set.

The trigger radio frame includes scheduling information of the scheduling device to the scheduled device; and after receiving the trigger radio frame, the scheduled device transmits the trigger-based radio frame to the scheduling device according to the scheduling information carried by the trigger radio frame. The first parameter module provides transmission parameter information for the scheduling device to transmit the radio frame. The second parameter module provides reception parameter information for the scheduling device to receive the radio frame. The third parameter module stores the second parameter set and forwards the stored second parameter set to the second parameter module. The first parameter set includes transmission parameter information or transmission signaling information required for the scheduling device to transmit the radio frame. The second parameter set includes reception parameter information or reception signaling information required for the scheduling device to receive the radio frame. The third parameter set includes the reception parameter information or the reception signaling information which is included in the second parameter set and is required for the scheduling device to receive the radio frame.

An embodiment of the present disclosure further provides a system for configuring radio transmission and reception parameters. The system includes a scheduling device and a scheduled device. The scheduling device includes the above apparatus for configuring radio transmission and reception parameters.

The method for configuring radio transmission and reception parameters provided by the embodiments of the present disclosure will be described in detail in conjunction with specific implementation scenarios.

Embodiment 1

In a basic service set (BSS), before multiple scheduled stations supporting the 802.11ax transmits a trigger-based PPDU, a scheduling device supporting the 802.11ax transmits a trigger radio frame to the scheduled station. The trigger radio frame includes transmission parameter information required for the scheduled station to transmit the trigger-based PPDU, such as a modulation and coding scheme (MCS), resource allocation information (including the size and position of available resources of each user), the number of spatial streams. The transmission parameter information is carried by a common info field and a user info field of the trigger radio frame.

In the radio frame transmission process (including the preparation time from the start of the transmission process on the media access control (MAC) layer to the start of the radio frame transmission on the physical (PHY) layer), the MAC layer of the scheduling device transmits the parameter information for transmitting the radio frame to the PHY layer through a primitive. Except for the condition that confirmation is not needed, after the primitive of the MAC layer is received and the corresponding configuration operation is executed, the PHY layer transmits a primitive to the MAC layer to confirm the primitive received from the MAC layer. After receiving the primitive for the confirmation operation, the MAC layer may start a new round of interaction process until the end of the transmission process. It is to be noted that one or more other complete or incomplete primitive interaction processes may also exist before the corresponding primitive for the confirmation operation from the PHY layer is received. The (part of) primitive interactions involved in the radio frame transmission process may be seen in FIG. 1. The trigger radio frame transmission may be summarized as follow. Before the trigger radio frame transmission starts (specifically, after the transmission process on the MAC layer starts), the MAC layer of the scheduling device transmits a physical layer transmission start request (PHY-TXSTART-request) primitive to the PHY layer to inform the PHY layer of transmission parameter information required for transmitting the trigger radio frame, such as the MCS, a coding scheme, the number of spatial streams, the number of users. The transmission parameter information for transmitting the trigger radio frame is carried by a TXVECTOR parameter of the PHY-TXSTART-request) primitive. Unlike the transmission of other types of radio frames, when the trigger radio frame is transmitted, in addition to the transmission parameter information of the trigger radio frame, the TXVECTOR also carries the transmission parameter information for the scheduled station to transmit the trigger-based PPDU (i.e., scheduling information included in a part or all of trigger radio frames). The trigger radio frame carries a transmission parameter used by the trigger radio frame to trigger the trigger-based PPDU, including a bandwidth, an MCS, etc.

Figure 1:
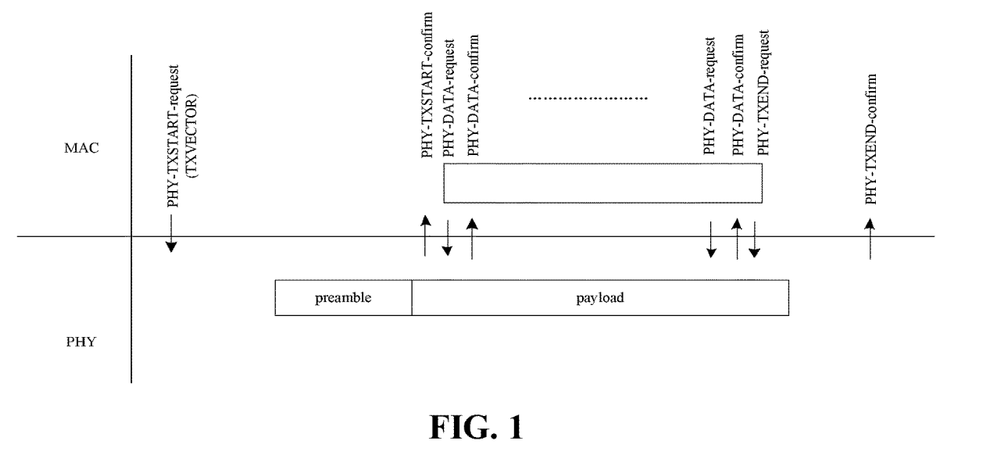
FIG. 1 illustrates a primitive exchange between a PHY layer and a MAC layer in a radio frame transmission process according to Embodiment 1 of the present disclosure.

In addition, the MAC layer also needs to indicate whether the radio frame transmitted by the PHY layer at this time is a trigger radio frame. The main function of the trigger radio frame transmission indication is to inform the PHY layer that the TXVECTOR parameter in the PHY-TXSTART-request primitive carries the reception parameter information for receiving the trigger-based PPDU transmitted by the scheduled station, including a bandwidth, an MCS, etc. The trigger radio frame transmission indication may be carried by the TXVECTOR parameter or other parameters. If the trigger radio frame transmission indication is 1, the radio frame transmitted by the PHY layer at this time is the trigger radio frame. If the trigger radio frame transmission indication is 0, the radio frame transmitted by the PHY layer at this time is not the trigger radio frame.

Figure 2:
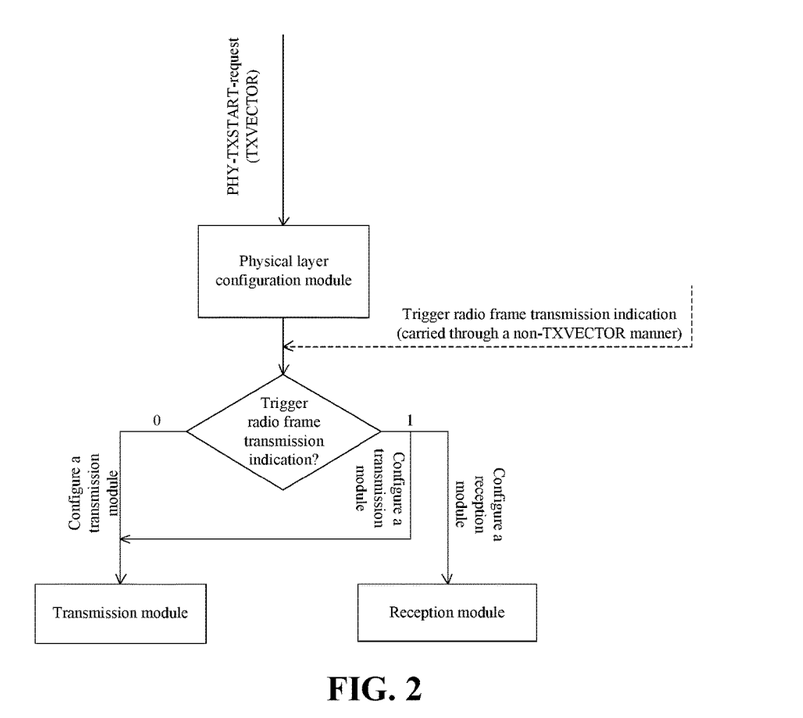
FIG. 2 is an operation flow of a configuration module of the PHY layer according to Embodiment 1 of the present disclosure.

After receiving the PHY-TXSTART-request primitive, a configuration module of the PHY layer parses the TXVECTOR to obtain the required transmission parameter information (as shown in FIG. 2). If the trigger radio frame transmission indication is 1, the configuration module of the PHY layer configures a transmission module of the PHY layer by using the transmission parameter information of the trigger radio frame, and the transmission module of the PHY layer transmits the trigger radio frame by using the transmission parameter information of the trigger radio frame (including operations of adding a preamble, encoding and modulating data to be transmitted from the MAC layer, etc.). The configuration module of the PHY layer configures a reception module of the PHY layer by using the transmission parameter information for the scheduled station to transmit the trigger-based PPDU, and the reception module of the PHY layer receives the trigger-based PPDU transmitted by the scheduled station (including operations of demodulating and decoding the trigger-based PPDU, etc.) by using the transmission parameter information of the trigger-based PPDU.

It is to be noted that the above operation is completed before the scheduling station receives the trigger-based PPDU transmitted by the scheduled station.

If the trigger radio frame transmission indication is 0, the configuration module of the PHY layer configures the transmission module of the PHY layer by using the transmission parameter information of the radio frame, and the transmission module of the PHY layer transmits the radio frame by using the transmission parameter information of the radio frame. The configuration module of the PHY layer does not perform the operation of configuring the reception module of the PHY layer.

Embodiment 2

Figure 3:
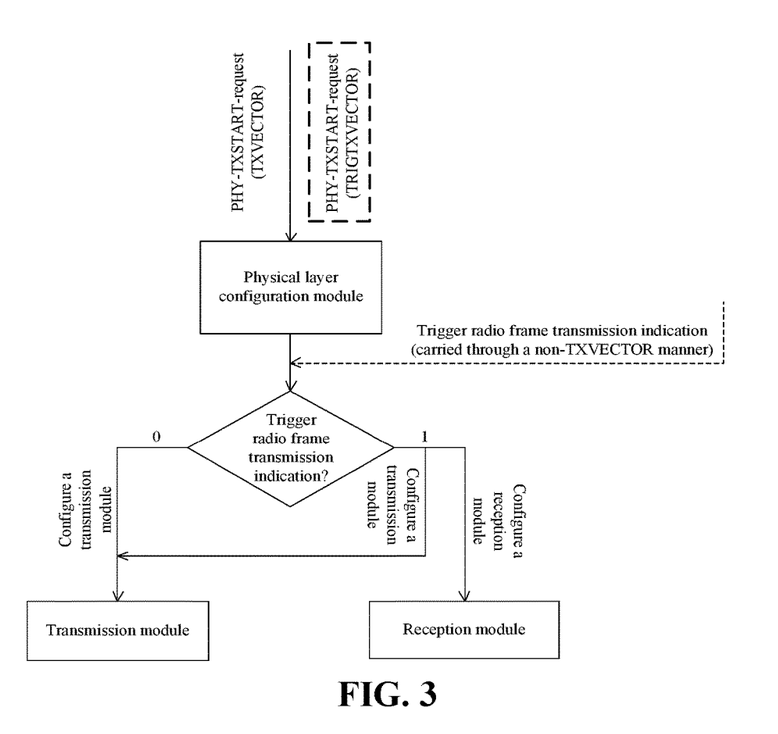
FIG. 3 is an operation flow of a configuration module of the PHY layer according to Embodiment 2 of the present disclosure.

In this embodiment, the basic assumption and configuration process are similar to that in Embodiment 1, but the difference is that: a variable (e.g., a TRIGTXVECTOR) different from the TXVECTOR in the PHY-TXSTART-request primitive is used for carrying the transmission parameter information for the scheduled station to transmit the trigger-based PPDU. The trigger radio frame transmission indication is used for identifying whether to transmit the trigger radio frame, is carried in the TXVECTOR. The trigger radio frame transmission indication is explicit indication, which is independent of the TXVECTOR; or the existence of the TRIGTXVECTOR parameter is an implicit indication. The manner of implicitly indicating whether to transmit the trigger radio frame is as follows. The existence of the TRIGTXVETOR variable indicates that a frame currently transmitted is the trigger radio frame. The absence of the TRIGTXVETOR variable indicates that the frame currently transmitted is not the trigger radio frame. If the trigger radio frame transmission indication is 1 (or the PHY-TXSTART-request primitive carries the TRIGTXVETOR variable), after receiving the PHY-TXSTART-request primitive, the configuration module of the PHY layer simultaneously parses the TXVECTOR and the TRIGTXVECTOR, configures the transmission module of the PHY layer by using the transmission parameter information of the trigger radio frame and configures the reception module of the PHY layer by using the transmission parameter information of the trigger-based PPDU transmitted by the scheduled station (as shown in FIG. 3). The transmission module of the PHY layer transmits the trigger radio frame using the transmission parameter information of the trigger radio frame, and the reception module of the PHY layer receives the trigger-based PPDU transmitted by the scheduled station by using the transmission parameter information of the trigger-based PPDU transmitted by the scheduled station.

After the scheduling station successfully receives the trigger-based PPDU transmitted by the scheduled station, or after the scheduling station fails to receive the trigger-based PPDU transmitted by the scheduled station, the transmission parameter information configured in the reception module for the scheduled station to transmit the trigger-based PPDU is invalid. The reception module needs to receive a subsequent radio frame according to the information included in a frame head of the received radio frame; or after new configuration information of the reception module takes effect, the radio frame is received according to this information. If the trigger radio frame transmission indication is 0 (or the PHY-TXSTART-request primitive carries the TRIGTXVETOR variable), the configuration module of the PHY layer configures the transmission module of the PHY layer by using the transmission parameter information of the radio frame, and the transmission module of the PHY layer transmits the radio frame by using the transmission parameter information of the radio frame. The configuration module of the PHY layer does not perform the operation of configuring the reception module of the PHY layer.

Embodiment 3

Figure 4:
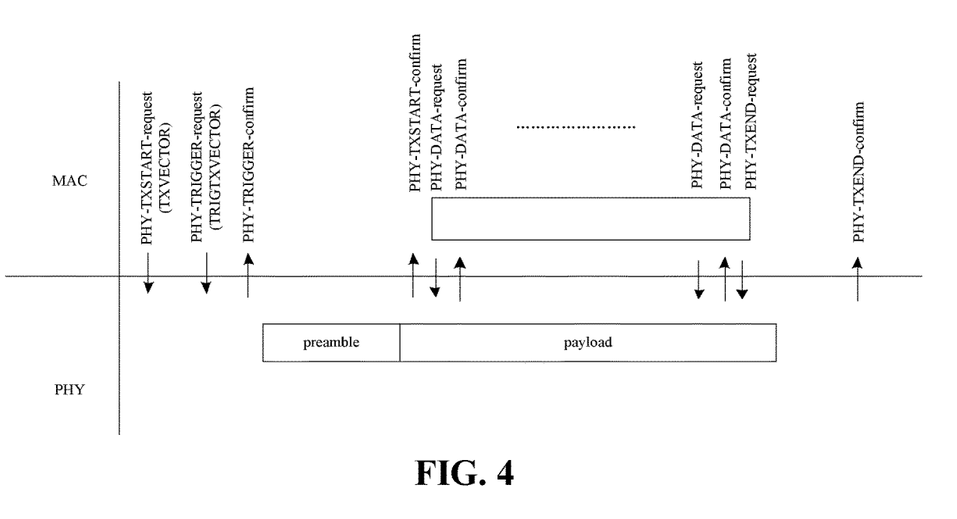
FIG. 4 illustrates a primitive exchange between the PHY layer and the MAC layer in a trigger radio frame transmission process according to Embodiment 3 of the present disclosure.

The basic assumption is similar to that of Embodiment 1. The scheduling device (or the MAC layer of the scheduling device) transmits a trigger-based PPDU request primitive to the PHY layer (e.g., a PHY-Trigger-request) before receiving the scheduling-based radio frame of the scheduled station. A variable (e.g., the TRIGTXVECTOR) in the trigger-based PPDU request primitive carries the transmission parameter information for the scheduled station to transmit the trigger-based PPDU. After parsing the information and configuring the reception module of the PHY layer, and before receiving the scheduling-based radio frame of the scheduled station, the configuration module of the PHY layer transmits a confirmation primitive (e.g., a PHY-TRIGGER-confirm) to the MAC layer to inform the MAC layer that the reception module of the PHY layer has completed the configuration (in order to ensure that the confirmation primitive is received by the MAC layer before the scheduling-based radio frame is received, the request primitive for transmitting the trigger-based PPDU should be transmitted as soon as possible). FIG. 4 shows an example of a feasible interaction (time points of transmission of the request primitive and the confirmation primitive are for reference only, and other reasonable choices are within the scope of the present embodiment). It is to be noted that in the above operation, the confirmation primitive (PHY-TRIGGER-confirm) transmitted from the PHY layer to the MAC layer may not exist. In this case, the PHY layer is also required to complete the configuration of the reception module before receiving the scheduling-based radio frame of the scheduled station.

Embodiment 4

The basic assumption is similar to that of Embodiment 1.

An independent parameter module A is set through scheduling. The MAC layer carries the transmission parameter information for the scheduled station to transmit the trigger-based PPDU through a primitive or in other manners, and configures the parameter module A by using the information.

It is to be noted that this embodiment describes how to configure the parameter module A by using the transmission parameter information of the trigger-based PPDU and how to subsequently configure the reception module of the PHY layer by using the parameter module A. The following operations also within the scope of the present embodiment: whether to configure the parameter module A by using the transmission parameter of the trigger radio frame, how to subsequently configure the transmission module of the PHY layer by using the parameter module A, and if necessary, how can the MAC layer configure the parameter module A by using the transmission parameter information of both the trigger radio frame and the trigger-based PPDU, and how can the parameter module A configure the reception module and the transmission module of the PHY layer (e.g., the parameter module A is configured by using the transmission parameter information of the trigger radio frame, the parameter configuration module A is configured by using the transmission parameter information of the trigger-based PPDU after the parameter module A completes the configuration the transmission module of the PHY layer, and then the parameter module A configures the reception module of the PHY layer; or after the parameter module A is configured by using the above two types of parameter information at the same time, the parameter module A configures the reception module and the transmission module of the PHY layer sequentially or simultaneously).

If the trigger radio frame transmission indication is 1 (the manner of indicating the trigger radio frame transmission may refer to Embodiment 2, the independent explicit indication is used as example herein and other manners are also within the scope of the present embodiment), the parameter module A initializes or configures the reception module of the PHY layer by using the stored transmission parameter information for the scheduled station to transmit the trigger-based PPDU, and the reception module of the PHY layer receives the trigger-based PPDU of the scheduled station by using the transmission parameter information for the scheduled station to transmit the trigger-based PPDU. If the trigger radio frame transmission indication is 0, the parameter module A does not initialize or configure the reception module of the PHY layer. Or, if the trigger radio frame transmission indication is 1, the reception module of the PHY layer reads the transmission parameter information for the scheduled station to transmit the trigger-based PPDU in the parameter module A, and the reception module of the PHY layer receives the trigger-based PPDU of the scheduled station by using the transmission parameter information for the scheduled station to transmit the trigger-based PPDU; and if the trigger radio frame transmission indication is 0, the reception module of the PHY layer does not read the transmission parameter information for the scheduled station to transmit the trigger-based PPDU in the parameter module A. It is to be noted that the PHY layer is required to complete the configuration of the reception module before receiving the scheduling-based radio frame of the scheduled station.

Embodiment 5

The basic assumption is similar to that of Embodiment 1. The scheduling device, which may be an access point (AP) or a station (STA), or the MAC layer of the scheduling device transmits the trigger-based PPDU request primitive to the PHY layer of the scheduling device (e.g., a PHY-Trigger-request). The variable in the trigger-based PPDU request primitive (e.g., the TRIGTXVECTOR) carries the reception parameter information for receiving the trigger-based PPDU respectively transmitted by multiple scheduled stations. In this case, the reception parameter information for receiving the trigger-based PPDU respectively transmitted by multiple scheduled stations is the same as the corresponding transmission parameter of the trigger-based PPDU respectively transmitted by multiple scheduled stations, including a bandwidth, a resource location, an MCS, etc. of each scheduled station.

After parsing the information and configuring the reception module of the PHY layer, the PHY layer of the scheduling device transmits a confirmation primitive (e.g., a PHY-TRIGGER-confirm) to the MAC layer to inform the MAC layer that the reception module of the PHY layer has completed the configuration (in order to ensure that the confirmation primitive is received by the MAC layer before the scheduling-based radio frame is received, the request primitive for transmitting the trigger-based PPDU should be transmitted as soon as possible).

It is to be noted that in the above operation, the confirmation primitive (PHY-TRIGGER-confirm) transmitted from the PHY layer to the MAC layer may not exist. In this case, the PHY layer is also required to complete the configuration of the reception module before receiving the scheduling-based radio frame of the scheduled station.

It should be understood by those skilled in the art that the embodiments of the present disclosure may be provided as methods, systems or computer program products. Therefore, the present disclosure may be implemented by hardware, software, or a combination of hardware and software. In addition, the present disclosure may take the form of a computer program product implemented in one or more computer-usable storage media (including, but not limited to, a disk memory and an optical memory) that includes computer-usable program codes.

The above are only preferred embodiments of the present disclosure and are not intended to limit the scope of the present disclosure.

What is claimed is:

1. A method for configuring parameters, comprising:
   transmitting, by a station, a first radio frame by using a first parameter set, wherein the first radio frame has a second parameter set; and
   configuring, by the station, a reception process by using the second parameter set;
   wherein the first parameter set is carried by a parameter variable in an interactive primitive of a scheduling device,
   wherein the interactive primitive includes: a transmission start request primitive, a data request primitive, and a transmission end request primitive,
   wherein validity of the second parameter set continues until a second radio frame is successfully received or the second radio frame fails to be received,
   wherein the second parameter set comprises a parameter of a common parameter or signaling part of the first radio frame and a parameter of a user parameter or signaling part of the first radio frame,
   wherein the user parameter or signaling part comprises at least one of: an identifier number of an associated user, resource unit allocation, a coding type, a modulation and coding scheme, whether to use dual-carrier modulation, or spatial stream allocation, and
   wherein the common parameter or signaling part comprises at least one of: a bandwidth, a guard interval and a long training sequence type, a long training sequence type of multi-user multiple-input and multiple-output (MU-MIMO), a number of efficient long training sequences, whether to use space-time coding, whether to have an additional symbol part of a low density check code, a packet extension type, or whether to use a fixed pilot.

2. The method of claim 1, wherein a media access control (MAC) layer of the station transmits a vector parameter set having the first parameter set to a physical (PHY) layer through a first primitive or a first instruction, to instruct the PHY layer to configure a transmission process by using the first parameter set.

3. The method of claim 1, wherein an MAC layer of the station transmits a vector parameter set having the second parameter set to a PHY layer through a second primitive or a second instruction, to instruct the PHY layer to configure the reception process by using the second parameter set.

4. The method of claim 1, wherein the validity of the second parameter set does not exceed a predefined time length, or a predefined number of received frames, or a predefined number of received bytes.

5. The method of claim 1, further comprising:
   receiving the second radio frame, wherein the second radio frame is triggered by the first radio frame, and all or a part of the second parameter set is used as a transmission parameter.

6. A radio communication device, comprising:
   a processor and a transceiver configured to:
      transmit a first radio frame by using a first parameter set, wherein the first radio frame has a second parameter set; and
      directly or indirectly configure a reception process of the device by using the second parameter set; and
   a memory, which is coupled to the processor;
   wherein the first parameter set is carried by a parameter variable in an interactive primitive of the device,
   wherein the interactive primitive includes: a transmission start request primitive, a data request primitive, and a transmission end request primitive,
   wherein validity of the second parameter set continues until a second radio frame is successfully received or the second radio frame fails to be received,
   wherein the second parameter set comprises a parameter of a common parameter or signaling part of the first radio frame and a parameter of a user parameter or signaling part of the first radio frame,
   wherein the user parameter or signaling part comprises at least one of: an identifier number of an associated user, resource unit allocation, a coding type, a modulation and coding scheme, whether to use dual-carrier modulation, or spatial stream allocation, and
   wherein the common parameter or signaling part comprises at least one of: a bandwidth, a guard interval and a long training sequence type, a long training sequence type of multi-user multiple-input and multiple-output (MU-MIMO), a number of efficient long training sequences, whether to use space-time coding, whether to have an additional symbol part of a low density check code, a packet extension type, or whether to use a fixed pilot.

7. A method, comprising:
   receiving a first radio frame transmitted using a first parameter set, wherein the first radio frame has a second parameter set; and
   transmitting a second radio frame, wherein all or a part of the second parameter set is used as a transmission parameter of the second radio frame;
   wherein the first parameter set is carried by a parameter variable in an interactive primitive of a scheduling device,
   wherein the interactive primitive includes: a transmission start request primitive, a data request primitive, and a transmission end request primitive, wherein validity of the second parameter set continues until the second radio frame is successfully received or the second radio frame fails to be received, wherein the second parameter set comprises a parameter of a common parameter or signaling part of the first radio frame and a parameter of a user parameter or signaling part of the first radio frame, wherein the user parameter or signaling part comprises at least one of: an identifier number of an associated user, resource unit allocation, a coding type, a modulation and coding scheme, whether to use dual-carrier modulation, or spatial stream allocation, and wherein the common parameter or signaling part comprises at least one of: a bandwidth, a guard interval and a long training sequence type, a long training sequence type of multi-user multiple-input and multiple-output (MU-MIMO), a number of efficient long training sequences, whether to use space-time coding, whether to have an additional symbol part of a low density check code, a packet extension type, or whether to use a fixed pilot.

8. A radio communication device, comprising:

a processor and a transceiver configured to:
receive a first radio frame transmitted using a first parameter set, wherein the first radio frame carries a second parameter set; and
transmit a second radio frame, wherein all or a part of the second parameter set is used as a transmission parameter of the second radio frame; and a memory, which is coupled to the processor;

wherein the first parameter set is carried by a parameter variable in an interactive primitive of a scheduling device, wherein the interactive primitive includes: a transmission start request primitive, a data request primitive, and a transmission end request primitive, wherein validity of the second parameter set continues until the second radio frame is successfully received or the second radio frame fails to be received, wherein the second parameter set comprises a parameter of a common parameter or signaling part of the first radio frame and a parameter of a user parameter or signaling part of the first radio frame, wherein the user parameter or signaling part comprises at least one of: an identifier number of an associated user, resource unit allocation, a coding type, a modulation and coding scheme, whether to use dual-carrier modulation, or spatial stream allocation, and wherein the common parameter or signaling part comprises at least one of: a bandwidth, a guard interval and a long training sequence type, a long training sequence type of multi-user multiple-input and multiple-output (MU-MIMO), a number of efficient long training sequences, whether to use space-time coding, whether to have an additional symbol part of a low density check code, a packet extension type, or whether to use a fixed pilot.

* * * * *